US008228887B2

(12) United States Patent
Aziz et al.

(10) Patent No.: US 8,228,887 B2
(45) Date of Patent: Jul. 24, 2012

(54) CELL IDENTIFIER ENCODING AND DECODING METHODS AND APPARATUS

(75) Inventors: Ahsan U. Aziz, Austin, TX (US); Vikram Chandrasekhar, Austin, TX (US); James Wesley McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 1019 days.

(21) Appl. No.: 11/540,784

(22) Filed: Sep. 29, 2006

(65) Prior Publication Data

US 2008/0080439 A1    Apr. 3, 2008

(51) Int. Cl.
  *H04B 7/216* (2006.01)
  *H04B 7/208* (2006.01)
  *H04B 1/00* (2006.01)
(52) U.S. Cl. ......... 370/342; 370/344; 375/130; 375/362
(58) Field of Classification Search .......... 370/342–344; 375/130–153, 362–368
  See application file for complete search history.

(56) References Cited

U.S. PATENT DOCUMENTS

| | | | |
|---|---|---|---|
| 6,047,019 A * | 4/2000 | Ishii | 375/148 |
| 6,801,567 B1 * | 10/2004 | Schmidl et al. | 375/149 |
| 2001/0015699 A1 * | 8/2001 | Chiles et al. | 342/120 |
| 2005/0002369 A1 | 1/2005 | Ro et al. | |
| 2005/0053048 A1 * | 3/2005 | Van Der Wal et al. | 370/350 |
| 2005/0111522 A1 | 5/2005 | Sung et al. | |
| 2005/0157637 A1 | 7/2005 | Feng et al. | |
| 2005/0238083 A1 | 10/2005 | Laroia et al. | |
| 2005/0265293 A1 * | 12/2005 | Ro et al. | 370/335 |
| 2005/0271026 A1 * | 12/2005 | Song et al. | 370/342 |
| 2006/0007850 A1 * | 1/2006 | Park et al. | 370/209 |
| 2006/0039451 A1 * | 2/2006 | Zhuang et al. | 375/145 |
| 2006/0062196 A1 | 3/2006 | Cai et al. | |
| 2006/0083189 A1 * | 4/2006 | Laroia et al. | 370/319 |
| 2006/0126491 A1 | 6/2006 | Ro et al. | |
| 2006/0172759 A1 * | 8/2006 | Ishihara | 455/525 |
| 2007/0064730 A1 * | 3/2007 | Jin et al. | 370/468 |

(Continued)

FOREIGN PATENT DOCUMENTS

EP    1507378 A1    2/2005

(Continued)

OTHER PUBLICATIONS

ETRI, Comparison of One-SCH and Two-SCH schemes for EUTRA Cell Search, 3GPP TSG RAN WG1 Meeting #45, Shanghai, China, 8012 May 2006.*

(Continued)

*Primary Examiner* — George Eng
*Assistant Examiner* — Jing Gao
(74) *Attorney, Agent, or Firm* — Gazdzinski & Associates, PC

(57) ABSTRACT

In an embodiment, a wireless communication system (100, FIG. 1) includes one or more nodes (102-108) and one or more user equipments (UE) (110). A node may apply (502, FIG. 5) a cell-specific spreading code to a cell identifier, which indicates an identity of a cell (113, FIG. 1) serviced by the node. The node may insert (504, FIG. 5), into a frame (200, FIG. 2), at least one synchronization channel symbol, which corresponds to the spread cell identifier, and the node may transmit (506, FIG. 5) the frame over an air interface. A UE may receive (702, FIG. 7) a frame from the air interface. The UE may despread (708) the spread cell identifier, and acquire (712) a cell identifier corresponding to a particular cell.

21 Claims, 5 Drawing Sheets

U.S. PATENT DOCUMENTS

2008/0089282 A1 * 4/2008 Malladi et al. ................ 370/329

FOREIGN PATENT DOCUMENTS

| EP | 1657872 A1 | | 5/2006 |
| JP | 2005-198232 | | 7/2005 |
| WO | WO01/45284 A1 | * | 6/2001 |
| WO | WO 2006/023423 A2 | | 3/2006 |
| WO | WO 2006/023536 A2 | | 3/2006 |

OTHER PUBLICATIONS

International Search Report and Written Opinion related to International Application No. PCT/US07/75952, Mar. 6, 2008.

* cited by examiner

CELL IDENTIFIER ENCODING AND DECODING METHODS AND APPARATUS

BACKGROUND

In a wireless communication network (e.g., a cellular telephone network), each of multiple base stations may service a cell within which wireless devices may communicate with the network. A particular wireless device may be within communication range of multiple base stations. Accordingly, the system may implement a protocol to determine with which base station the device will communicate.

In many cases, it may be beneficial for the device to communicate with a base station having the highest Signal-to-Interference plus Noise Ratio (SINR). However, in the presence of significantly strong signals from multiple base stations, a determination of the base station with the best SINR may be prone to error. Wireless system developers continue to seek methods and apparatus for reducing the percentage of errors encountered in base station selection processes.

DETAILED DESCRIPTION

Embodiments described herein include methods and apparatus implemented within wireless communication systems, user equipment, and base stations. In various embodiments, the term "wireless communication system" may be defined as a communication system in which user equipment and system nodes communicate with each other over an air interface. A wireless communication system may be a system such as a cellular telephone system, a radio system, a satellite communication system, a wireless local area network (WLAN), a wireless personal area network (WPAN), an air-to-air or air-to-ground communication system, other wireless systems, or combinations of various types of systems, for example but not by way of limitation.

Figure 1:
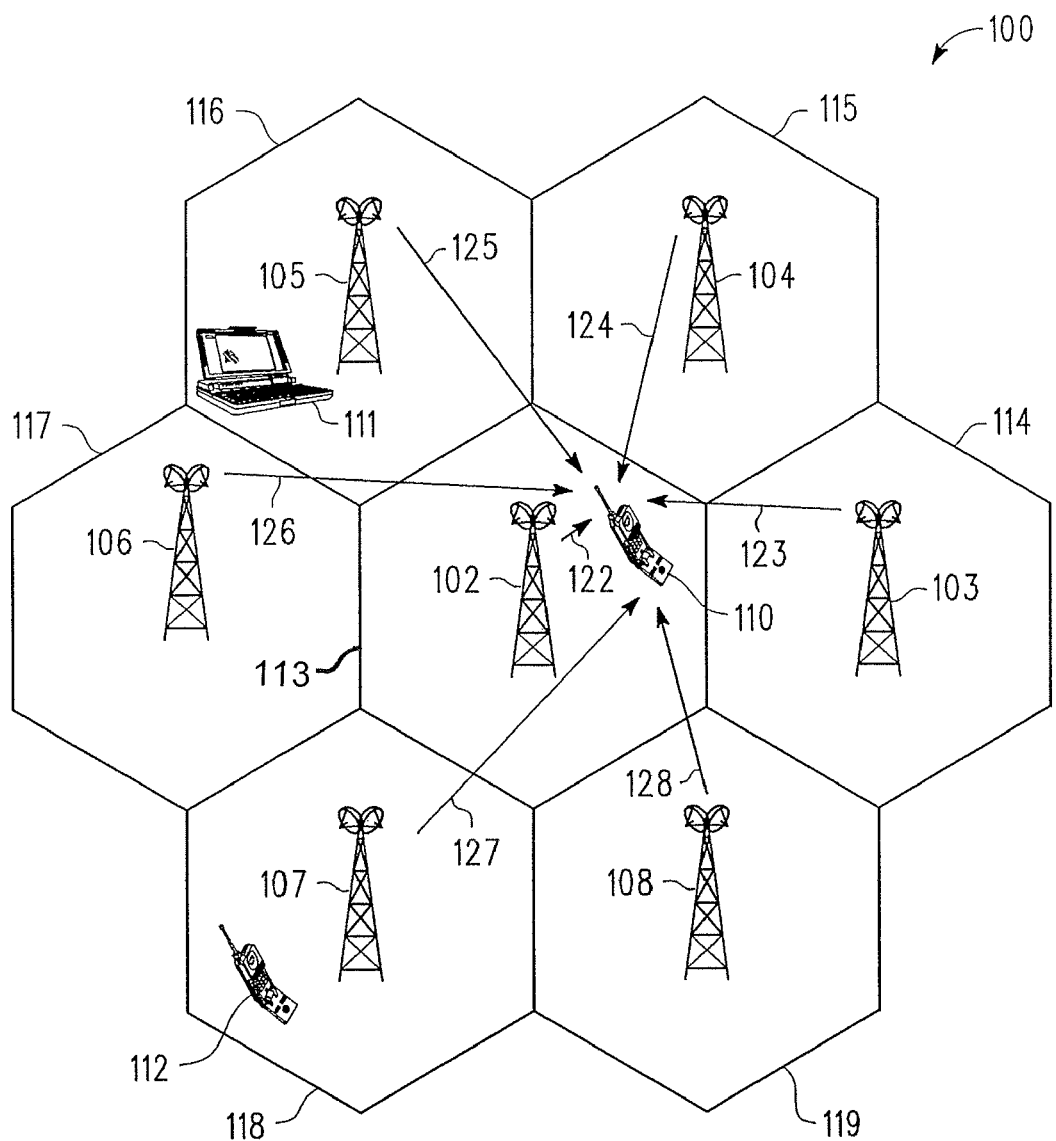
FIG. 1 illustrates a wireless communication system, in accordance with an example embodiment.

FIG. 1 illustrates a wireless communication system 100, in accordance with an example embodiment. System 100 may include at least one base station (BS) 102, 103, 104, 105, 106, 107, 108 and at least one wireless communication unit, which is referred to herein as user equipment (UE) 110, 111, 112. Although seven BSs 102-108 and three UEs 110-112 are illustrated in FIG. 1, system 100 may include more or fewer BSs and/or UEs. In various embodiments, system 100 may include from one to thousands of BSs and from one to millions of UEs.

UEs 110-112 may include wireless communication apparatus, which may transmit and/or receive information over an air interface or other wireless communication medium. UEs (e.g., UE 110, 111, 112) may be selected from a group of equipment types that includes, but is not limited to, cellular telephones, one-way and two-way radios, computers, personal data assistants (PDAs), pagers, and WPAN-compatible devices, other types of wireless communication apparatus, and equipment that provides multiple types of functionality, for example.

BS 102-108, which also may be referred to as "node" or "cell site," may include a transceiver, which receives uplink radio signals from UEs 110-112 and broadcasts downlink radio signals toward UEs 110-112. BSs 102-108 may be connected together to form a BS network.

A group of BSs 102-108 together service a network of cells 113, 114, 115, 116, 117, 118, 119 within which information may be exchanged with UEs 110-112. Multiple cells may be used to provide communications over a larger area than would be possible to service using just one cell. Each BS 102-108 may service at least one cell 113-119 to facilitate wireless communications between BSs 102-108 and UEs 110-112. Generally, a cell 113-119 is defined by a static or dynamic geographical area proximate to a BS 102-108.

Each cell 113-119 may include at least one "sector." In an embodiment, each cell 113-119 includes three sectors, although it may include some other number of sectors (e.g., from one to hundreds), in other embodiments. A "sector" may be defined, in various embodiments, as a portion of a cell to which a distinct set of channels is allocated, which channels are distinct from the channels of other sectors of the same cell. A "sector" also may be defined, in various embodiments, as geographical area that is allocated a portion of the bandwidth available to the BS, which portion does not overlap the portions allocated to other sectors of the same cell. A "sector" also may be defined, in various embodiments, as a geographical area serviced by one of multiple, directional antenna subsystems of a BS, each of which provides coverage (e.g., channels) over a different geographical area.

The term "cell," as used herein, may include a single sector or it may include multiple sectors that are serviced by a BS. Although system 100 illustrates one cell 113-119 associated with each BS 102-108, each BS 102-108 may service multiple cells (e.g., two, three or more) and/or may service multiple cell sectors within a cell, in various embodiments.

Communications between BS 102-108 and UEs 110-112 may be governed by one or more communication technologies. For example, but not by way of limitation, communications between BSs 102-108 and UEs 110-112 may use any of a number of modulation and multiple access technologies. In various embodiments, modulation and multiple access on the uplink and/or downlink may be performed using one or more technologies selected from a group of technologies that includes, but is not limited to, Time Division Multiple Access (TDMA), Frequency Division Multiple Access (FDMA), Code Division Multiple Access (CDMA), Wideband CDMA (WCDMA), Orthogonal FDMA (OFDMA), Interleaved FDMA (IFDMA), Discrete Fourier Transform (DFT) spread OFDMA (DFT OFDMA), Spatial Division Multiple Access (SDMA), or combinations thereof, for example. In an embodiment, system 100 provides a "multi-carrier network," which may use a multi-carrier technology (e.g., OFDM) in order to communicate between BSs 102-108 and UEs 110-112.

In an embodiment, BS 102-108 may transmit downlink signals synchronously, as is the case in a synchronized network. Accordingly, a UE 110-112 may receive a downlink waveform that represents a sum of sufficiently strong signals transmitted by multiple BS 102-108. In an alternate embodiment, BS 102-108 may transmit downlink signals asynchronously, as is the case in an asynchronous network. For example, as illustrated in FIG. 1, UE 110 may receive downlink signals 122, 123, 124, 125, 126, 127, 128 transmitted synchronously or asynchronously from any or all of BS 102-108. Generally, however, a UE (e.g., UE 110) receives network services from and exchanges data traffic primarily with one BS (e.g., BS 102) at a time. Certain exceptions may occur, such as communications during a handoff from one BS to another, for example.

At various times, a UE 110-112 may evaluate downlink signals 122-128 and determine with which BS 102-108 the UE 110-112 will communicate. BS 102-108 not selected may be considered "interfering" BS. Various criteria, such as the Signal-to-Interference plus Noise Ratio (SINR) of each of the received signals 122-128, may be used to determine with which BS 102-108 a UE 110-112 will communicate.

When a UE 110-112 powers up, it may perform an "initial cell search" operation, in which it attempts to determine a BS 102-108 with the strongest SINR. Once that determination is made, the UE 110-112 may attempt to lock onto that BS 102-108 and begin service. After service has begun, conditions may change (e.g., a UE 110-112 may move) such that downlink signals from another BS 102-108 may have a stronger SINR than signals from the current BS 102-108 with which the UE 110-112 is communicating. In such cases, it may be desirable for the UE 110-112 to hand off to the other BS 102-108. In both the initial cell search and handoff cases, a UE 110-112 may evaluate information within multiple downlink signals 122-128 to aid in the determination of which BS 102-108 the UE 110 will communicate with.

One item of information that a BS 102-108 may transmit in a downlink signal is a representation of a Cell Identifier (Cell ID). A Cell ID is a code that is assigned by the system 100 to indicate the identity of a particular cell (e.g., cells 113-119) and/or sector serviced by the BS. A system (e.g., system 100) may have from one to hundreds of cells, and accordingly may assign from one to hundreds of unique Cell IDs. For example, but not by way of limitation, a system may have 512 or more unique Cell IDs that it may be able to assign. In a particular embodiment, a system may have about 524 unique Cell IDs that it may be able to assign.

In an embodiment, a BS 102-108 encodes its Cell ID using a multi-carrier modulation technique. In a particular embodiment, a BS 102-108 encodes its Cell ID using an Orthogonal Frequency Division Multiplexing (OFDM) modulation technique. OFDM techniques divide the available spectrum into multiple sub-carriers, and "distribute" information across the sub-carriers. As will be described in more detail below, a UE 110-112 determines with which BS 102-108 it will communicate during the process of decoding a Cell ID in a downlink signal, in various embodiments.

A BS 102-108 encodes information within a frame format prior to transmission on the downlink. Each frame may include from one to many subframes and/or fields, within which various types of information are communicated. Receiving equipment (e.g., UEs 110-112) may synchronize in the time and frequency domains to receive and decode a frame accurately.

Figure 2:
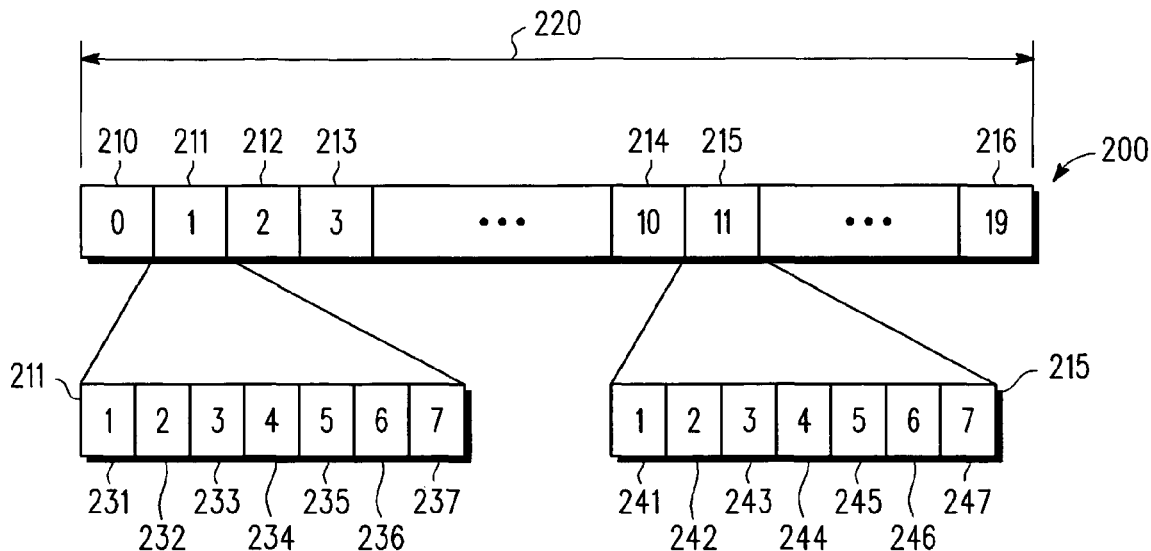
FIG. 2 illustrates a downlink frame structure, in accordance with an example embodiment.

FIG. 2 illustrates a downlink frame structure 200, in accordance with an example embodiment. Frame 200 includes multiple subframes 210, 211, 212, 213, 214, 215, 216, in an embodiment. For ease of illustration, FIG. 2 shows a subset of subframes 210-216 (designated as "0," "1," "2," "3," . . . "10," "11," . . . "19") included within frame 200, where intermediate subframes (not illustrated) are indicated by " . . . ". In an embodiment, frame 200 includes twenty subframes 210-216. In other embodiments, frame 200 may include more or fewer subframes.

Selected ones of subframes (e.g., subframes 211, 215) may include multiple symbols 231, 232, 233, 234, 235, 236, 237, 241, 242, 243, 244, 245, 246, 247. Each symbol 231-237, 241-247 may be designated to include a certain type of information. For example, subframes 211 and 215 each include seven symbols 231-237, 241-247 (each designated as "1," "2," "3," "4," "5," "6," "7"). In other embodiments, a subframe may include more or fewer symbols.

In an embodiment, frame 200 includes at least one primary synchronization channel (SCH) symbol and at least one secondary SCH symbol. A primary SCH (PSC) symbol may include information that a UE (e.g., UE 110-112) may use to perform symbol timing and carrier frequency offset (CFO) estimation in the process of decoding a secondary SCH (SSC) symbol. An SSC symbol may include encoded Cell ID information.

In a particular embodiment, frame 200 includes two PSC symbols and two SSC symbols, where the PSC symbols and SSC symbols are arranged in back-to-back pairs. Each pair includes one PSC symbol and one SSC symbol, in an embodiment. For convenience, the two PSC symbols may be designated as PSC1 and PSC2, and the two SSC symbols may be designated as SSC1 and SSC2. Accordingly, the SCH symbol pairs may be designated as (PSC1, SSC1) and (PSC2, SSC2).

In an embodiment, the SCH symbol pairs are separated from each other over one half of a frame duration. For example, in an embodiment in which a frame duration 220 is approximately 10 milliseconds (ms), the SCH symbol pairs may be separated from each other by approximately 5 ms. For example, in a particular embodiment, for a first SCH symbol pair, PSC1 may reside in symbol 236 and SSC1 may reside in symbol 237 (e.g., symbols 6 and 7 of subframe 211). For a second SCH symbol pair, PSC2 may reside in symbol 246 and SSC2 may reside in symbol 247 (e.g., symbols 6 and 7 of subframe 215).

Figure 3:
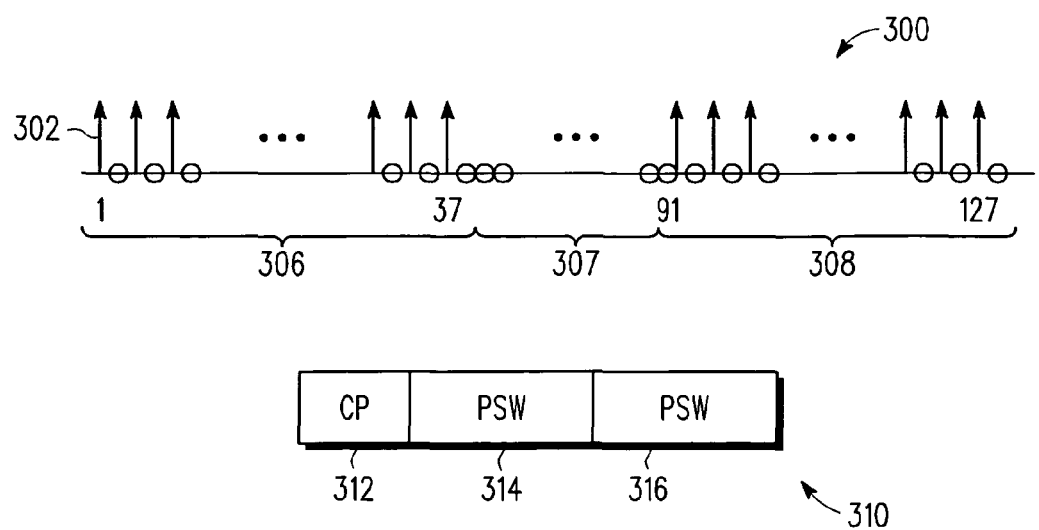
FIG. 3 illustrates example representations of a primary synchronization channel symbol, in accordance with an example embodiment.

In an embodiment, information included within the one or more PSC symbols (e.g., PSC1, PSC2) may be used to decode the one or more SSC symbols (e.g., SSC1, SSC2), and provides the capability to perform a hierarchical cell search procedure. FIG. 3 illustrates example representations of a PSC symbol (e.g., PSC1 and/or PSC2), in accordance with an example embodiment. A PSC symbol may include synchronization waveforms, which are cell-common (e.g., common to substantially all cells of a system) and known to a UE (e.g., UE 110-112, FIG. 1). In an embodiment, a length of a PSC symbol sequence is 38 elements 302, which populate every alternate sub-carrier of portions of PSC symbol 300. In an embodiment, half of the 38 elements are positioned within a first set 306 of consecutive sub-carriers, a second set 307 of consecutive sub-carriers is left unpopulated, and the other half of the 38 elements are positioned within a third set 308 of consecutive sub-carriers. In alternate embodiments, a PSC symbol sequence may include more or fewer elements, and/or may populate sub-carriers other than as described above.

Further, in an embodiment, PSC symbol 300 has time-domain symmetry. A time-domain representation 310 of the PSC symbol may include a cyclic prefix (CP) field 312 and primary symmetric waveform (PSW) fields 314, 316. Gold sequences or other +/−1 sequences with acceptable auto- and cross-correlation properties may be used in the PSC symbol. Correlation of the symmetric waveforms in fields 314, 316 may yield timing and frequency offsets, which a UE (e.g., UE 110-112, FIG. 1) may use to decode the Cell ID within the SSC symbols.

The one or more SSC symbols may include encoded Cell ID information, in an embodiment (e.g., the SSC symbol(s) may correspond to a spread Cell ID). Each SSC symbol in a frame may include an encoded generalized chirp like (GCL) index and a Tone index, in an embodiment. An overall Cell ID may be specified by the combination of {(GCL Index 1, Tone Index 1), (GCL Index 2, Tone Index 2)}, where a first part of the Cell ID information, or (GCL Index 1, Tone Index 1), may be encoded into SSC1, and a second part of the Cell ID information, or (GCL Index 2, Tone Index 2), may be encoded into SSC2, in an embodiment. For generating an SSC symbol, a BS spreads an 11 element, tone modulated GCL sequence (e.g., generated using prime $N_{GCL}=13$) by a cell-specific spreading code, in an embodiment. After the spreading operation, the total sub-carrier occupancy of an SSC symbol sequence equals 77 sub-carriers (e.g., 1.155 MHz), in an embodiment. In an embodiment in which the number of valid tones is assumed to be $N_{Tone}=2$, a total of $(N_{GCL}-1)*N_{Tone}=12*2=24$ Cell IDs can be represented by each SSC symbol. Assuming that there are two distinct SSC symbols per frame, which encode a distinct GCL Index, Tone index Cell ID pair, this gives to a total of $24^2=576$ distinct Cell IDs that may be represented within the system.

System functionality, with respect to embodiments of the inventive subject matter, may be simplified as follows. In various embodiments, the system may assign a "cell-specific spreading code" to each cell within the system, and may distribute the cell-specific spreading codes to the BSs. Each BS then may apply its cell-specific spreading code to its Cell ID information, and insert the spread, encoded Cell ID information into the SSC symbols of the downlink frame. A UE may receive the frame, and may despread the Cell ID information using multiple spreading codes known to the UE. The UE may then determine which spreading code yielded the strongest despread information, and may further determine to which BS that spreading code is assigned. UE processing of received frames may be different for embodiments implemented in synchronous networks and asynchronous networks, as will be described in more detail later. The UE may then, at its option, lock onto that BS and begin service. FIGS. 4-9 illustrate embodiments of methods for performing the system functions described in this paragraph.

Figure 4:
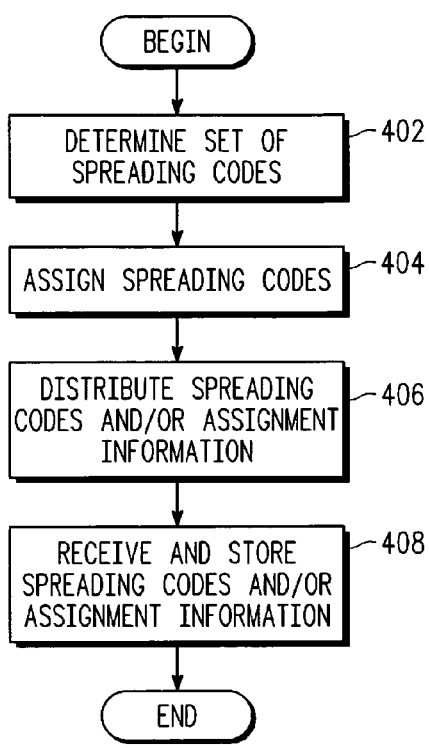
FIG. 4 is a flowchart of a method for assigning and distributing spreading codes to base stations, in accordance with an example embodiment.

FIG. 4 is a flowchart of a method for assigning and distributing spreading codes to BSs, in accordance with an example embodiment. In an embodiment, certain processes described in conjunction with FIG. 4 (e.g., blocks 402-408) may be performed by a system control facility. In other embodiments, some or all of the processes may be performed by a BS.

In block 402, an embodiment of the method begins by determining, by the system, a set of one or more "cell-specific" spreading codes, which may be assigned to current and/or future BSs of the system. In an embodiment, the set of spreading codes includes at least one spreading code for each BS, and/or for each cell, and/or for each sector within the system. Embodiments below discuss one cell-specific spreading code for each BS. In alternate embodiments, spreading codes may be re-used within the system (e.g., multiple BS may be assigned the same spreading code according to a re-use pattern).

The set of one or more cell-specific spreading codes may be derived from an Orthogonal Variable Spreading Factor (OVSF) spreading code sequence matrix, in an embodiment. In an alternate embodiment, the set of one or more cell-specific spreading codes may be derived from a Constant Amplitude Zero Autocorrelation Code (CAZAC) spreading code sequence matrix. Other types of spreading codes may be used, in still other embodiments. A spreading code sequence matrix may include a set of multiple-element spreading codes, each of which are perfectly orthogonal or substantially orthogonal to each other.

In an embodiment, each cell-specific spreading code has seven elements, and thus has a spreading factor of seven. The spreading factor may be specified based on various factors. For example, in an embodiment, a symbol may correspond to a certain number of sub-carriers. For example, a symbol may correspond to 128 sub-carriers, only a subset of which may be used. In an embodiment, 77 sub-carriers are used per symbol. Further, in an embodiment, the Cell ID representation may be an 11 tone modulated GCL sequence. With 77 sub-carriers available, each of the 11 tones may be spread by a factor of 7. In other embodiments, a cell-specific spreading code may have more or fewer elements (e.g., the spreading factor may be different), and/or there may be more or fewer sub-carriers used, and/or the GCL sequence may include more or fewer tones.

Embodiments of the inventive subject matter include selecting and assigning cell-specific spreading codes that are "substantially orthogonal," which may be defined as "perfectly orthogonal" or "nearly orthogonal." Codes may be considered to be "perfectly orthogonal" when their inner product is zero, meaning that when the codes are multiplied element-by-element, and the products are added, the result is zero. In other words, for perfectly orthogonal codes, their cross-correlation values are zero. Codes may be considered to be "nearly orthogonal" when their cross-correlation values are significantly lower than their auto-correlation peaks (e.g., their cross-correlation values are nearly zero).

In an embodiment, cell-specific spreading codes are substantially orthogonal. In a further embodiment, cell-specific spreading codes are nearly orthogonal. In still a further embodiment, cell-specific spreading codes are perfectly orthogonal and include seven elements. In still a further embodiment, cell-specific spreading codes are substantially orthogonal and include seven elements. In still a further embodiment, cell-specific spreading codes are nearly orthogonal and include seven elements.

The number of cell-specific spreading codes determined in block 402 may be based on the cell geometry and a re-use factor employed in the system. In an embodiment, the system determines seven cell-specific, substantially orthogonal spreading codes. An example rationale for the number of spreading codes is explained below.

Referring again to FIG. 1, center cell 113 is illustrated to be bordered by six adjacent cells 114-119. The six adjacent cells 114-119 may be referred to as the center cell's 113 immediate "neighbors," or as cells that are within the "first tier." The hexagonal modeling of cells 113-119 leads to the configuration of a center cell with six immediate neighbors. In other systems or in other areas of system 100, a cell may be modeled with a different shape, and/or may be bordered by more or fewer adjacent cells.

Desirably, center cell 113 will have assigned to it at least one spreading code that is different from the spreading codes assigned to its immediate neighbor cells 114-119. Accordingly, the spreading code assigned to center cell 113 is unique from the spreading codes assigned to the cells in the first tier. In some systems, re-use of the spreading codes may occur beyond the first tier, such that the same spreading code may be assigned to multiple cells that do not border each other. For ease of description, a re-use factor of seven is described herein, which indicates that a center cell and its six immediate neighbors each have assigned to them unique spreading codes. In other systems or other portions of system 100, the re-use factor may be different, and/or each and every cell of the system may have assigned to it a spreading code that is different from the spreading codes assigned to the other system cells.

In the example embodiment, with a re-use factor of seven, the set of cell-specific spreading codes may include as few as seven codes. A particular cell-specific spreading code may be represented as SCn, where n=1 to the number of codes in the set. Accordingly, the set ("C-SSC") of cell-specific spreading codes may be represented as C-SSC={SC1, SC2 ... SCn}. Each cell-specific spreading code may be identified by an index into a table of cell-specific spreading codes. In an embodiment, C-SSC may include the following seven spreading codes, which may represent a subset of an OVSF spreading code sequence matrix:

$$C\text{-}SSC = \{(1, 1, 1, 1, 1, 1, 1),$$
$$(1, 1, 1, 1, -1, -1, -1),$$
$$(1, 1, -1, -1, 1, 1, -1),$$
$$(1, 1, -1, -1, -1, -1, 1),$$
$$(1, -1, 1, -1, 1, -1, 1),$$
$$(1, -1, 1, -1, -1, 1, -1),$$
$$(1, -1, -1, 1, 1, -1, -1)\}.$$

The element values for the cell-specific spreading codes, above, are for example purposes only. It is to be understood that, in other embodiments, the cell-specific spreading code elements may have other values, and/or may be derived from a different type of spreading code matrix (e.g., a CAZAC spreading code sequence matrix and/or circular shifts of a CAZAC sequence). Further, in other embodiments, more or fewer than seven cell-specific spreading codes may be included in the set C-SSC. As described previously, the cell-specific spreading codes listed above may not be perfectly orthogonal because the number of elements is seven. Instead, in an embodiment, the codes are nearly orthogonal. In other embodiments, the cell-specific spreading codes may be orthogonal and/or may include more or fewer than seven elements.

Referring again to FIG. 4, an embodiment of the method continues, in block 404, by the system assigning at least one spreading code to each current cell of the system. In an embodiment, the system may assign one of the cell-specific spreading codes determined in block 402 to each cell. In an embodiment, a spreading code index may be associated with each cell-specific spreading code. Table 1 indicates example assignments:

TABLE 1

Cell-Specific Spreading Code Assignments

| Spreading Code Index | Cell-Specific Spreading Code | Cell | BS |
|---|---|---|---|
| 1 | SC1 | cell 1 (e.g., cell 113, FIG. 1) | BS 1 (e.g., BS 102, FIG. 1) |
| 2 | SC2 | cell 2 (e.g., cell 114) | BS 2 (e.g., BS 103) |
| 3 | SC3 | cell 3 (e.g., cell 115) | BS 3 (e.g., BS 104) |
| 4 | SC4 | cell 4 (e.g., cell 116) | BS 4 (e.g., BS 105) |
| 5 | SC5 | cell 5 (e.g., cell 117) | BS 5 (e.g., BS 106) |
| 6 | SC6 | cell 6 (e.g., cell 118) | BS 6 (e.g., BS 107) |
| 7 | SC7 | cell 7 (e.g., cell 119) | BS 7 (e.g., BS 108) |

For ease of explanation, the description herein describes a single cell-specific spreading code as being assigned to each cell, and further describes each BS as servicing one cell. It is to be understood that, in other embodiments, the system may assign more than one cell-specific spreading code to each cell. In a particular embodiment, the system may assign a cell-specific spreading code to each sector. Also, in other embodiments, a BS may service multiple cells or sectors, and the same cell-specific spreading code may be assigned to each of the BS's multiple cells/sectors or each of the multiple cells/sectors may be assigned a different spreading code. In addition, for ease of explanation, the description below indicates that the cell-specific spreading code assigned to each cell is unique (e.g., different from the other spreading codes). It is to be understood that a finite number of spreading codes may be available, so that in very large systems, a spreading code may be assigned to multiple cells according to a reuse pattern. Embodiments of the inventive subject matter are not intended to be limited to a system in which a single unique, cell-specific spreading code is assigned to each cell, or a system in which each BS may service only one cell. It is to be understood that embodiments of the inventive subject matter further include variations described in this paragraph and elsewhere.

An embodiment of the method continues, in block 406, by the system distributing the cell-specific spreading codes and the cell-specific spreading code assignment information to the BSs and the UEs. In an embodiment, distributing the cell-specific spreading codes may include sending one or more messages to each BS, which include a list or table of the cell-specific spreading codes determined in block 402, and/or a list of indices to a table of spreading codes to which the BS otherwise has access. In an embodiment, distributing the cell-specific spreading code assignment information may include sending a control message to each BS that includes the cell-specific spreading code assigned to a cell that the BS is servicing. In alternate embodiments, the system may send, to the BS, a spreading code index, or some other indicator that identifies the cell-specific spreading code assigned to its cell.

In an embodiment, the system also distributes, to each UE, the cell specific spreading codes determined in block 402 (and/or indices to those codes) and the cell-specific spreading code assignment information determined in block 404. This information may be communicated to the UEs through one or more BS or other system elements.

In block 408, an embodiment of the method continues by each BS receiving and storing the cell-specific spreading code assignment information. The BS may later use the assigned cell specific spreading code to spread its Cell ID information on the downlink, in various embodiments, as will be described below. The method then ends.

Figure 5:
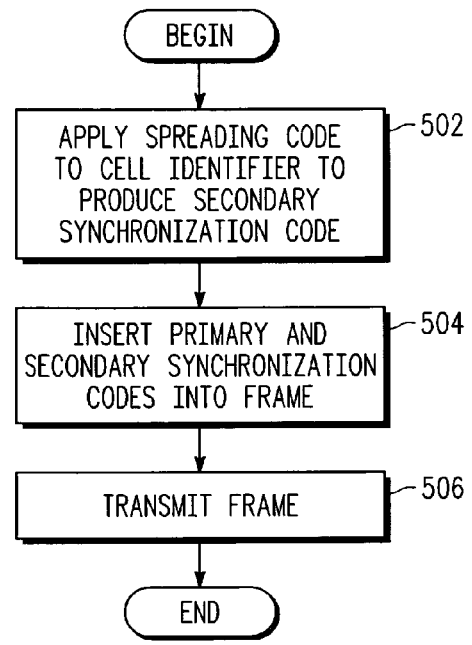
FIG. 5 is a flowchart of a method for applying a spreading code to a cell identifier and for transmitting a frame, in accordance with an example embodiment.

FIG. 5 is a flowchart of a method for applying a spreading code to a Cell ID and for transmitting a frame, in accordance with an example embodiment. In an embodiment, certain processes described in conjunction with FIG. 5 may be performed by a BS.

In block 502, an embodiment of the method begins by the BS applying a cell-specific spreading code to the Cell ID representation, to produce a "spread" SSC. In an embodiment, as described previously, the SSC may correspond to two OFDM symbols (e.g., symbols 237, 247, FIG. 2).

In an embodiment, each SSC symbol sequence may occupy a total of 77 OFDM sub-carriers, and may be generated by applying a cell-specific spreading code over an 11 tone modulated GCL sequence whose prime index equals 13. Table 2 shows an example of individual sub-carrier allocations corresponding to each element of an 11 tone modulated GCL sequence after a spreading operation has been carried out:

TABLE 2

Sub-Carrier Allocation of Tone Modulated GCL Sequence After Spreading

| Index of GCL Element | Sub-Carrier Allocation After Spreading |
|---|---|
| 1 | 91:97 |
| 2 | 98:104 |
| 3 | 105:111 |
| 4 | 112:118 |
| 5 | 119:125 |
| 6 | 126:128, 1:4 |
| 7 | 5:11 |
| 8 | 12:18 |
| 9 | 19:25 |
| 10 | 26:32 |
| 11 | 33:39 |

In block 504, an embodiment of the method continues by the BS inserting the one or more SSC symbols in a communication frame along with one or more PSC symbols. For example, in an embodiment, the BS may insert two PSC symbols and two SSC symbols into a frame (e.g., frame 200, FIG. 2), where the PSC symbols and SSC symbols are arranged in back-to-back SCH symbol pairs. In an embodiment, the SCH symbol pairs are separated from each other over one half of a frame duration. For example, as described previously in conjunction with FIG. 2, a first SCH symbol pair may reside in symbols 236 and 237 (e.g., symbols 6 and 7 of subframe 211), and a second SCH symbol pair may reside in symbol 246 and 247 (e.g., symbols 6 and 7 of subframe 215). In alternate embodiments, more or fewer PSC and/or SSC symbols may be used, and/or the symbols may be positioned in different places within a frame.

In block 506, an embodiment of the method continues by the BS transmitting (e.g., broadcasting) the frame over the air interface. In an embodiment, the frame is transmitted synchronously from all BS (e.g., the network is a synchronous network). In an alternate embodiment, the BSs may transmit the frame asynchronously (e.g., the network is an asynchronous network). The method then ends.

Once the BSs have transmitted the frame, a UE may receive and acquire the Cell ID information for a candidate BS (FIG. 7), in accordance with various embodiments. This process may be performed during a cell search operation (FIG. 6), during a handoff operation (FIG. 9), to provide information for interference cancellation/estimation, or at other times.

Figure 6:
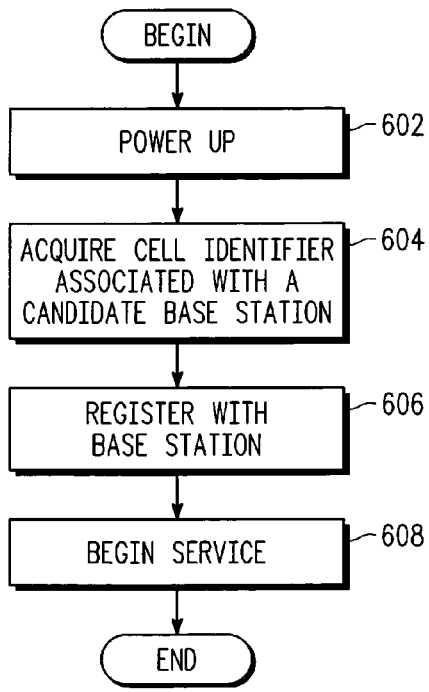
FIG. 6 is a flowchart of a method for a user equipment to perform a cell search operation, in accordance with an example embodiment.

FIG. 6 is a flowchart of a method for a UE to perform a cell search operation, in accordance with an example embodiment. In an embodiment, certain processes described in conjunction with FIG. 6 may be performed by a UE.

The method may begin, in block 602, when the UE is powered up. A cell search operation may be initiated at other times, as well, such as when a UE is attempting to re-acquire service after passing through an area without sufficient coverage.

In block 604, the UE may receive a frame that includes Cell ID information to which a cell-specific spreading code has been applied, in accordance with various embodiments, and the UE may acquire, from the received frame, the Cell IDs of cells serviced by one or more candidate BS. In an embodiment, the UE may acquire the Cell ID of a cell serviced by the BS that has the largest SINR detected at the UE. Acquiring a Cell ID from a received frame is described in detail in conjunction with FIG. 7.

In block 606, the UE may then register with, or lock onto, the candidate BS. This may include transferring information between the UE and the BS in the context of a service setup process.

In block 608, the UE may begin service with the candidate BS. For example, but not by way of limitation, the UE may begin cellular telephony service, paging service, data transfer service, or another type of services in which data frames are exchanged between the candidate BS and the UE. The method then ends.

Figure 7:
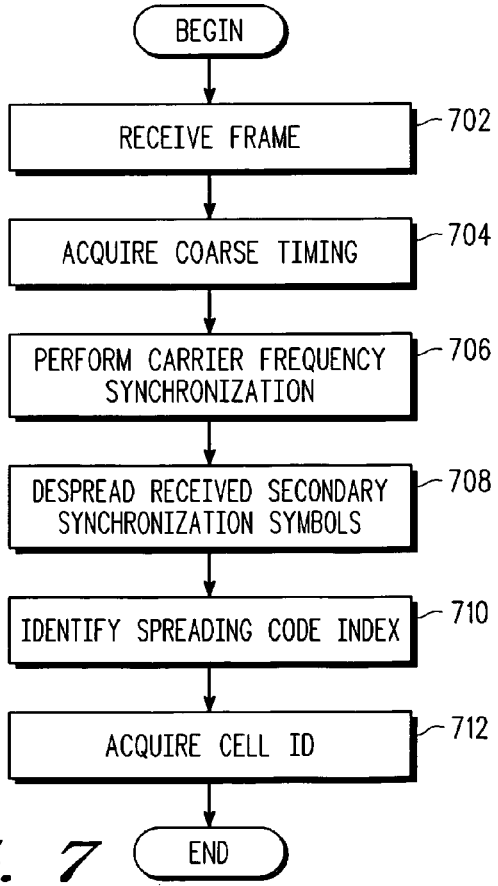
FIG. 7 is a flowchart of a method for acquiring a cell identifier from a received frame, in accordance with an example embodiment.

FIG. 7 is a flowchart of a method for acquiring a Cell ID from a received frame, in accordance with an example embodiment. (e.g., block 604, FIG. 6, block 902, FIG. 9). In an embodiment, certain processes described in conjunction with FIG. 7 may be performed by a UE.

In block 702, the UE may receive a waveform for a frame that includes Cell ID information to which a cell-specific spreading code has been applied, in accordance with various embodiments. In an embodiment, multiple BS (e.g., BS 102-108, FIG. 1) may synchronously transmit frames on their downlink signals (e.g., signals 122-128, FIG. 1).

In another embodiment, multiple BSs (e.g., BS 102-108, FIG. 1) may asynchronously transmit frames on their downlink signals (e.g., signals 122-128, FIG. 1). The sequence of processes described, below, may be implemented in a network in which BSs synchronously transmit frames (e.g., a synchronous network). However, the inventive subject matter is intended also to include embodiments implemented in a network in which BSs asynchronously transmit frames (e.g., an asynchronous network). Accordingly, variations of the flowchart described in conjunction with FIG. 7 for asynchronous transmissions are intended to be included within the scope of the inventive subject matter. For example, for embodiments implemented in an asynchronous network, multiple coarse timing estimates may be acquired (block 704), multiple fine symbol timing estimates may be identified (block 706), and multiple despreading operations may be performed (block 708).

In block 704, the UE may acquire coarse timing estimate for use in decoding Cell ID information, in an embodiment. A coarse timing estimate may be obtained by processing the one or more PSC symbols (e.g., symbols 236, 246, FIG. 2) in the received frame. In an embodiment, coarse timing acquisition may make use of the time-domain symmetry of the primary synchronization waveforms (PSW) (e.g., PSW 314, 316, FIG. 3) in order to locate the beginning of the SSC symbols.

In an embodiment, a coarse timing estimate may be acquired by performing an auto-correlation process (e.g., a blind timing acquisition scheme) on the received waveform, with a one-half symbol lag or a one-quarter symbol lag, as is represented by Equation 1:

$$\hat{l} = \underset{l}{\mathrm{argmax}}\left(\sum_{k=0}^{N_{fft}/2-1} r^*(k+l)r(k+N_{fft}/2+l)\right), \quad \text{Equation 1}$$

where $\hat{l}$ is the correlation maxima that provides coarse timing, k is the index of summation, r is the received signal, r* is the conjugate of the received signal, and $N_{fft}$ is the Fast Fourier Transform (FFT) size.

In another embodiment, a coarse timing estimate may be acquired by performing an M-point replica correlation process on a received waveform that includes a cell-common PSC waveform, and finding the correlation maxima, as is represented by Equation 2:

$$\hat{l} = \underset{l}{\mathrm{argmax}}\left(\sum_{m=0}^{M-1}\sum_{k=m^*N_{FFT}/M}^{(m+1)N_{fft}/M-1} |r^*(k+l)s_{PSC}(k)|^2\right), \quad \text{Equation 2}$$

where $\hat{l}$ is the correlation maxima that provides coarse timing, M is the number of points, and $S_{PSC}$ is the primary synchronization code (PSC). In an alternate embodiment, PSC may be sector specific.

In block 706, the UE may perform carrier frequency synchronization. In an embodiment, this may be achieved by computing a fractional carrier frequency offset (CFO) from the phase of the auto-correlation maxima (e.g., assuming half wave time-domain symmetry), as is represented by Equation 3:

$$\delta f_{fr} = \frac{1}{\pi N_{fft}}\mathrm{angle}\left(\sum_{k=0}^{N_{fft}/2-1} r^*(k+\hat{l})r(k)\right), \quad \text{Equation 3}$$

where $\delta f_{fr}$ is the fractional CFO ($<f_s/N_{fft}$ where $f_s$ is the sampling frequency).

In an embodiment, after fractional CFO correction, an integer CFO correction process may be performed in the frequency domain. In addition, this process may be used to identify the fine symbol timing.

When coarse timing adjustment and CFO correction have been performed, then in block 708, the UE may despread the received SSC symbols multiple times using the cell-specific spreading codes assigned to multiple candidate BS, in an embodiment. For example, in a system with a re-use factor of seven, as described previously, the UE may despread the received SSC symbols using each of the seven cell-specific spreading codes that may have been assigned to BS to which the UE is proximate. The Cell ID associated with a given cell may be obtained by concatenating or otherwise combining the results from despreading the first and second SSC symbols, using a given cell-specific spreading code assigned to that cell. When multiple cell-specific spreading codes are used to despread the SSC symbols, multiple results may be obtained (e.g., "despreading operation result"), each of which may have a different SINR.

In an embodiment, in block 710, the UE identifies one or more candidate spreading code indices from the despreading operation result (e.g., the despread SSC symbols). In an embodiment, the candidate spreading code indices may be identified as indices to the cell-specific spreading codes used to produce despread SSC with the largest SINRs. In some embodiments, only a single candidate spreading code index may be identified (e.g., the index associated with the single largest SINR). In other embodiments, multiple candidate spreading code indices may be identified (e.g., the n indices associated with the n largest SINRs).

Figure 8:
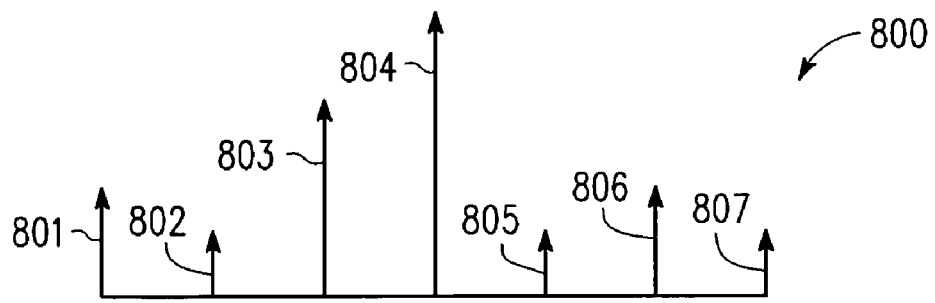
FIG. 8 is an example chart indicating signal strengths for despread secondary synchronization channel symbols, in accordance with an example embodiment.

FIG. 8 is an example chart 800 indicating the signal strengths for the despread SSC symbols for each of the cell-specific spreading codes used for despreading, in accordance with an example embodiment. In the example embodiment, seven unique, cell-specific spreading codes were used, producing seven despread outputs. Each peak 801, 802, 803, 804, 805, 806, 807 represents the SINR for the SSC symbols despread using a different cell-specific spreading code. For example, peak 801 may correspond to the SINR resulting from applying SC 1, peak 802 may correspond to the SINR resulting from applying SC2, and so on. In the example chart 800, peak 804 is the highest, indicating the largest SINR.

In an embodiment, the UE has knowledge of which cell-specific spreading code is associated with which spreading code index. Accordingly, by identifying the cell-specific spreading code that produced the largest peak (e.g., peak 804), the UE may identify the spreading code index that is associated with the largest SINR. In an embodiment, it is this index that is identified as the candidate spreading code index. In other embodiments, the UE may identify the n spreading code indices that are associated with the n largest SINRs.

In block 712, using the spreading code index or indices identified in block 710, a Cell ID may be acquired for the one or more candidate BSs determined in block 710. In an embodiment, blind Cell-ID detection of the GCL Index and Tone Index may be carried out using a combination of differential decoding and Discrete Fourier Transform (DFT). When multiple candidate spreading code indices have been identified, then blind Cell ID detection may be performed by a UE for each of the identified candidate spreading code indices. Identifying multiple candidate spreading code indices may be used in a handoff process, where a UE may desire to decode Cell IDs for multiple BSs. The method then ends.

Figure 9:
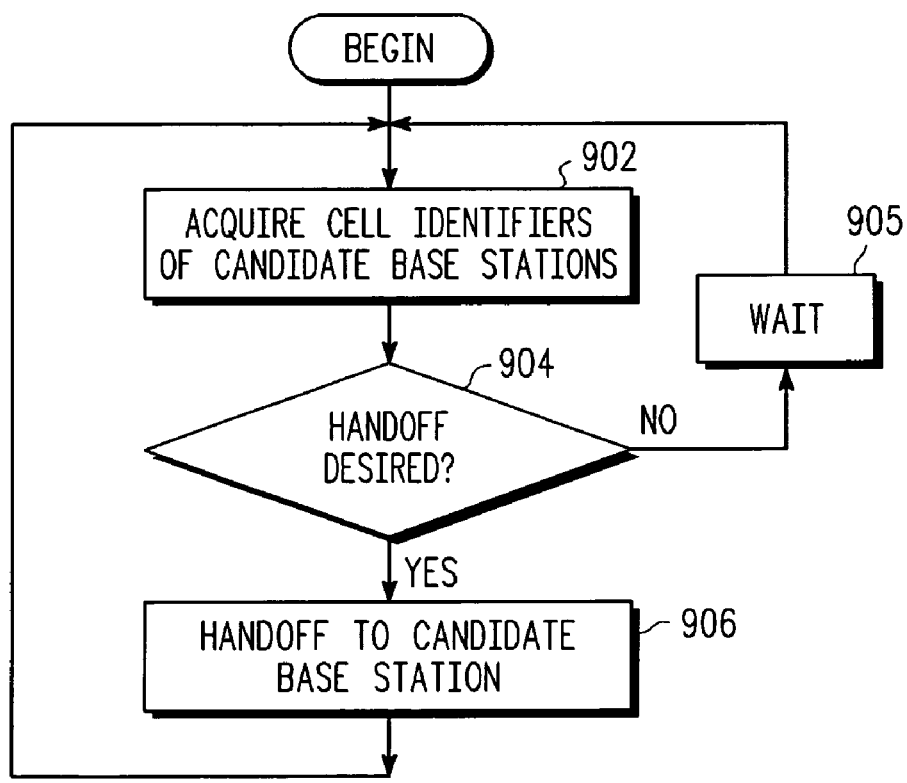
FIG. 9 is a flowchart of a method for a user equipment to handoff from one base station to another, in accordance with an example embodiment.

FIG. 9 is a flowchart of a method for a UE to handoff from one BS to another, in accordance with an example embodiment. In an embodiment, certain processes described in conjunction with FIG. 9 may be performed by a UE.

The method may begin, in block 902, when the UE receives a frame that includes Cell ID information to which a cell-specific spreading code has been applied, in accordance with various embodiments, and the UE may acquire the Cell IDs of one or more candidate BS from the frame. In an embodiment, the UE may acquire the Cell IDs of the n BSs having the largest SINRs. Acquiring Cell IDs from a received frame is described above in detail in conjunction with FIG. 7.

In block 904, the UE may then determine, based on the results from block 902, whether a handoff is desired. One or more variables may affect the decision of whether a handoff is desired, such as UE position and/or movement, network traffic, and relative SINR associated with candidate BSs, for example. If a handoff is not desired, then the method waits for some specified time, in block 905, and iterates as shown.

If a handoff is desired, then in block 906, the UE may then handoff to a candidate BS by registering with the candidate BS and discontinuing communications with the current BS. The method then iterates as shown.

The sequence of process blocks illustrated in FIGS. 4-7, and 9 are for example purposes, and are not to limit the scope of the inventive matter only to those process sequences. Instead, it is to be understood that, in alternate embodiments, some or all of the process blocks illustrated in FIGS. 4-7, and 9 may be performed in different orders, may be performed in parallel, may be combined together, may be expanded into multiple sub-processes, and/or may include one or more intermediate processes that are not illustrated. In addition, some of the process blocks may be optionally performed, in various embodiments.

Figure 10:
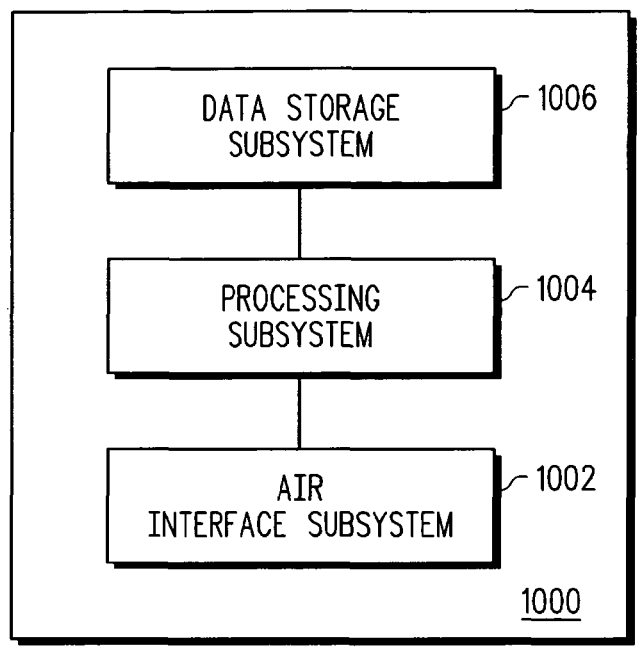
FIG. 10 is a simplified block diagram of a base station, in accordance with an example embodiment.

FIG. 10 is a simplified block diagram of a BS 1000, in accordance with an example embodiment. In an embodiment, BS 1000 includes at least one air interface subsystem 1002, at least one processing subsystem 1004, and at least one data storage subsystem 1006.

An air interface subsystem 1002 may include one or more antenna subsystems (not illustrated). An air interface subsystem 1002 may receive data from a processing subsystem 1004, convert the data into an analog signal, and cause the signal to be sent out over the air interface. In addition, an air interface subsystem 1002 may receive analog signals from the air interface, convert the signals into digital data, and provide the data to a processing subsystem 1004.

A processing subsystem 1004 may send information to and receive information from an air interface subsystem 1002. In various embodiments, a processing subsystem 1004 may include one or more integrated circuits, among other things. For example, but not by way of limitation, a processing subsystem 1004 may include one or more apparatus selected from a group of apparatus that includes general-purpose processors, special-purpose processors, application-specific integrated circuits (ASICs), and/or other devices, any or all of which may implement one or more process blocks described previously in conjunction with FIGS. 4 and 5, in various embodiments.

A data storage subsystem 1006 may store various types of data, and can include random access memory (RAM), read only memory (ROM), numerous variations of those types of memories, and/or other types of storage. A processing subsystem 1004 may access (e.g., store and/or retrieve) information from data storage subsystem 1006.

Although only one air interface subsystem 1002, processing subsystem 1004, and data storage subsystem 1006 are shown in FIG. 10 for ease of illustration, more of any or all of these subsystems may be included in a BS 1000, in various embodiments. In addition, other subsystems and/or components can be included in BS 1000, which enable BS 1000 to perform its intended functions. For example, but not by way of limitation, BS 1000 also may include subsystems and/or components that enable it to communicate with other BSs, and/or other wired or wireless networks.

Figure 11:
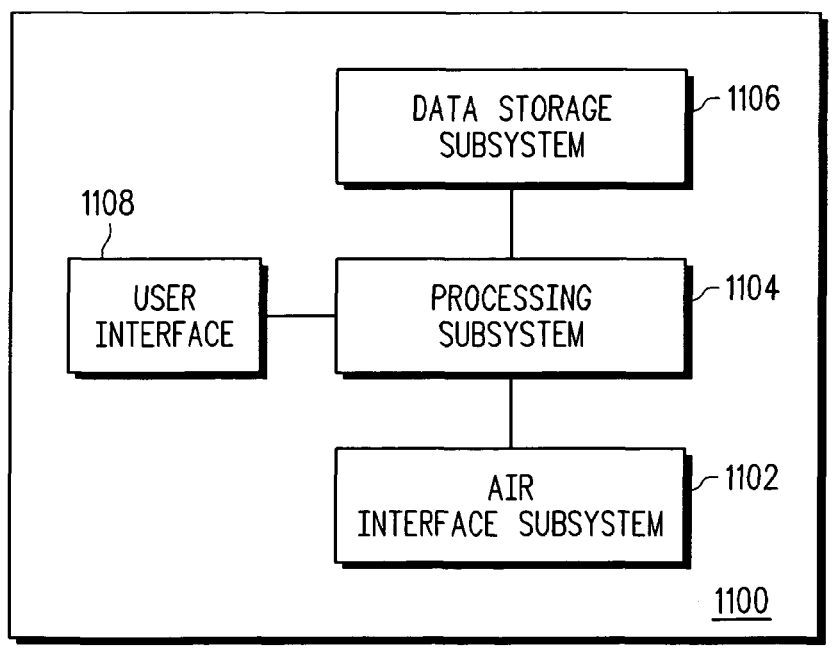
FIG. 11 is a simplified block diagram of a user equipment, in accordance with an example embodiment.

FIG. 11 is a simplified block diagram of a UE 1100, in accordance with an example embodiment. In an embodiment, UE 1100 includes at least one air interface subsystem 1102, at least one processing subsystem 1104, and at least one data storage subsystem 1106. In addition, in an embodiment, UE 1100 optionally may include at least one user interface 1108.

An air interface subsystem 1102 may include one or more antenna subsystems (not illustrated). An air interface subsystem 1102 may receive data from a processing subsystem 1104, convert the data into an analog signal, and cause the signal to be sent out over the air interface. In addition, an air interface subsystem 1102 may receive analog signals from the air interface, convert the signals into digital data, and provide the data to a processing subsystem 1104.

A processing subsystem 1104 may send information to and receive information from an air interface subsystem 1102. In various embodiments, a processing subsystem 1104 may include one or more integrated circuits, among other things. For example, but not by way of limitation, a processing subsystem 1104 may include one or more apparatus selected from a group of apparatus that includes general-purpose processors, special-purpose processors, ASICs, and/or other devices, any or all of which may implement one or more process blocks described previously in conjunction with FIGS. 6, 7, and 9, in various embodiments.

A data storage subsystem 1106 may store various types of data, and can include RAM, ROM, numerous variations of those types of memories, and/or other types of storage. A processing subsystem 1104 may access (e.g., store and/or retrieve) information from data storage subsystem 1106.

User interface 1108 may include any one or more types of user interfaces, including but not limited to keypads, keyboards, buttons, dials, pointing devices (e.g., mouse, trackball, etc.), microphones, speakers, and display screens, for example.

Although only one air interface subsystem 1102, processing subsystem 1104, data storage subsystem 1106, and user interface 1108 are shown in FIG. 11 for ease of illustration, more of any or all of these subsystems may be included in a UE 1100, in various embodiments. In addition, other subsystems and/or components can be included in UE 1100, which enable UE 1100 to perform its intended functions.

Thus, various embodiments of Cell ID encoding and decoding methods and apparatus have been described. Embodiments of the inventive subject matter include methods for communication between a node and a user equipment within a multi-carrier network, where the node is configured to transmit at least one frame over an air interface. A method, according to an embodiment, may include applying, by the node, a spreading code to a cell identifier to produce a spread cell identifier, wherein the cell identifier indicates an identity of a cell that is serviced by the node. The method further includes inserting at least one synchronization channel symbol into the frame, wherein the at least one synchronization channel symbol corresponds to the spread cell identifier, in an embodiment.

In a further embodiment, applying the spreading code may include applying the spreading code to the cell identifier, where the cell identifier is represented by a generalized chirp like index and a tone index. In a further embodiment, applying the spreading code may include applying a substantially orthogonal spreading code to the cell identifier. In a further embodiment, applying the spreading code may include applying a spreading code that includes seven elements.

In a further embodiment, inserting the at least one synchronization channel symbol may include inserting, into the frame, a first synchronization symbol pair that includes a first primary synchronization channel symbol and a first secondary synchronization channel symbol, where the first primary synchronization channel symbol can be used to decode the first secondary synchronization channel symbol, and where a first part of the cell identifier can be encoded into the first secondary synchronization channel symbol. Inserting the at least one synchronization channel symbol may further include, in an embodiment, inserting, into the frame, a second synchronization symbol pair that includes a second primary synchronization channel symbol and a second secondary synchronization channel symbol, where the second primary synchronization channel symbol can be used to decode the second secondary synchronization channel symbol, and where a second part of the cell identifier can be encoded into the second secondary synchronization channel symbol.

In an embodiment, the method may further include transmitting the frame over an air interface. In a further embodiment, transmitting the frame may include transmitting the frame synchronously with at least one other node. In a further embodiment, transmitting the frame may include transmitting the frame asynchronously from at least one other node.

A method, according to another embodiment, includes receiving at least one secondary synchronization channel symbol, which corresponds to a cell identifier to which a spreading code has been applied, despreading the at least one secondary synchronization channel symbol using one or more cell-specific spreading codes to produce a despreading operation result, and acquiring a cell identifier based on the despreading operation result, where the cell identifier indicates an identity of a cell serviced by a node that transmitted the at least one secondary synchronization channel symbol.

In a further embodiment, despreading the at least one secondary synchronization channel symbol may include despreading the at least one secondary synchronization channel symbol multiple times by applying, to the at least one secondary synchronization channel symbol, multiple cell-specific spreading codes assigned to multiple system nodes, to produce a despreading operation result that includes signal-to-interference plus noise ratio values associated with each of the multiple system nodes. In a further embodiment, applying the multiple cell-specific spreading codes may include applying multiple substantially orthogonal spreading codes to the at least one secondary synchronization channel symbol. In a further embodiment, applying the multiple cell-specific spreading codes may include applying multiple cell-specific spreading codes, each of which includes seven elements.

In a further embodiment, the method may include processing at least one primary synchronization channel symbol to perform coarse timing adjustment and carrier frequency offset correction prior to despreading the at least one secondary synchronization channel symbol. In a further embodiment, the method may include registering with the node associated with the cell identifier. In a further embodiment, the method may include handing off to the node associated with the cell identifier.

Embodiments of the inventive subject matter also include an apparatus that includes one or more integrated circuits to apply a spreading code to a cell identifier to produce a spread cell identifier, where the cell identifier indicates an identity of a cell serviced by a node of a multi-carrier network, and to insert at least one synchronization channel symbol into a frame, where the at least one synchronization channel symbol corresponds to the spread cell identifier.

In a further embodiment, the apparatus forms a portion of the node, and the apparatus also may include one or more air interface subsystems, operably coupled to the one or more integrated circuits, to transmit the frame synchronously over an air interface. In a further embodiment, the apparatus also may include one or more air interface subsystems, operably coupled to the one or more integrated circuits, to transmit the frame asynchronously over an air interface.

Embodiments of the inventive subject matter also include an apparatus that includes one or more integrated circuits to receive at least one secondary synchronization channel symbol, which corresponds to a cell identifier to which a spreading code has been applied, and to despread the at least one secondary synchronization channel symbol using at least one cell-specific spreading code to produce a despreading operation result, and to acquire a cell identifier based on the despreading operation result, where the cell identifier indicates an identity of a cell serviced by a node that transmitted the at least one secondary synchronization channel symbol.

In a further embodiment, the apparatus forms a portion of a user equipment, and the apparatus may also include one or more air interface subsystems, operably coupled to the one or more integrated circuits, to receive the at least one synchronization channel symbol over an air interface.

While the principles of the inventive subject matter have been described above in connection with specific systems, apparatus, and methods, it is to be clearly understood that this description is made only by way of example and not as a limitation on the scope of the inventive subject matter. For example, although embodiments employed in the context of a cellular telephone network have been described, it is to be understood that embodiments may be applied to other types of wireless networks, and functions performed in BS or UE may be performed in other types of system nodes or equipment. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for communication between a node and a user equipment within a multi-carrier network, wherein the node is configured to transmit at least one frame over an air interface, the method comprising:
   applying, by the node, a cell-specific spreading code to distinct parts of a cell identifier to produce multiple spread cell identifier parts, wherein the cell identifier indicates an identity of a cell that is serviced by the node, and wherein the cell-specific spreading code is derived from a subset of an orthogonal variable spreading factor spreading code sequence matrix; and
   inserting multiple secondary synchronization channel symbols into the frame, wherein each of the multiple secondary synchronization channel symbols corresponds to one of the multiple spread cell identifier parts;
   wherein responsive to receiving the frame, the user equipment despreads at least one of the multiple spread cell identifier parts, and determines a received signal quality based at least in part on the despread cell identifier parts.

2. The method of claim 1, wherein applying the spreading code comprises:
   applying the spreading code to the distinct parts of the cell identifier, wherein each of the distinct parts of the cell identifier is represented by a generalized chirp like index and a tone index.

3. The method of claim 1, wherein applying the spreading code comprises:
   applying a substantially orthogonal spreading code to the distinct parts of the cell identifier.

4. The method of claim 1, wherein applying the spreading code comprises:
   applying a spreading code that includes seven elements.

5. The method of claim 1, wherein inserting the multiple secondary synchronization channel symbols comprises:
   inserting, into the frame, a first secondary synchronization channel symbol and a second secondary synchronization channel symbol, wherein a first part of the cell identifier can be encoded into the first secondary synchronization channel symbol, and a second part of the cell identifier can be encoded into the second secondary synchronization channel symbol; and wherein the method further comprises inserting, into the frame, a first primary synchronization channel symbol and a second primary synchronization channel symbol, wherein the first primary synchronization channel symbol can be used to decode the first secondary synchronization channel symbol, and the second primary synchronization channel symbol can be used to decode the second secondary synchronization channel symbol.

6. The method of claim 1, further comprising:
transmitting the frame over an air interface.

7. The method of claim 6, wherein transmitting the frame comprises:
transmitting the frame synchronously with at least one other node.

8. The method of claim 6, further comprising:
transmitting the frame asynchronously from at least one other node.

9. A method for communication between a node and a user equipment within a multi-carrier network, wherein the node is configured to transmit at least one frame over an air interface, the method comprising:
receiving multiple secondary synchronization channel symbols, each of which corresponds to a distinct part of a cell identifier to which a cell-specific spreading code has been applied, wherein the cell-specific spreading code is derived from a subset of an orthogonal variable spreading factor spreading code sequence matrix;
despreading the multiple secondary synchronization channel symbols using one or more cell-specific spreading codes to produce a despreading operation result, comprising one or more received signal quality measurements corresponding to each of the one or more cell-specific spreading codes; and
acquiring a cell identifier based on the despreading operation result, wherein the cell identifier indicates an identity of a cell serviced by a node that transmitted the highest received signal quality measurement.

10. The method of claim 9, wherein despreading the multiple secondary synchronization channel symbols comprises:
despreading the multiple secondary synchronization channel symbols multiple times by applying, to the multiple secondary synchronization channel symbols, multiple cell-specific spreading codes assigned to multiple system nodes, to produce a despreading operation result that includes signal-to-interference plus noise ratio values associated with each of the multiple system nodes.

11. The method of claim 10, wherein applying the multiple cell-specific spreading codes comprises:
applying multiple substantially orthogonal spreading codes to the at least one secondary synchronization channel symbol.

12. The method of claim 10, wherein applying the multiple cell-specific spreading codes comprises:
applying multiple cell-specific spreading codes, each of which includes seven elements.

13. The method of claim 9, further comprising:
processing at least one primary synchronization channel symbol to perform coarse timing adjustment and carrier frequency offset correction prior to despreading the at least one secondary synchronization channel symbols.

14. The method of claim 9, further comprising:
registering with the node associated with the cell identifier.

15. The method of claim 9, further comprising:
handing off to the node associated with the cell identifier.

16. An apparatus comprising:
one or more integrated circuits adapted to apply a cell-specific spreading code to distinct parts of a cell identifier to produce multiple spread cell identifier parts, wherein the cell identifier indicates an identity of a cell serviced by a node of a multi-carrier network, and wherein the cell-specific spreading code is derived from a subset of an orthogonal variable spreading factor spreading code sequence matrix, and wherein the one or more integrated circuits are further adapted to insert multiple secondary synchronization channel symbols into a frame, wherein each of the multiple secondary synchronization channel symbols corresponds to one of the multiple spread cell identifier parts; and
wherein the multiple spread cell identifiers are configured to enable a receiver to determine a received signal quality associated with the cell identifier among a plurality of received cell identifiers.

17. The apparatus of claim 16, wherein the apparatus forms a portion of the node, and the apparatus further comprises:
one or more air interface subsystems, operably coupled to the one or more integrated circuits, to transmit the frame synchronously over an air interface.

18. The apparatus of claim 16, wherein the apparatus forms a portion of the node, and the apparatus further comprises:
one or more air interface subsystems, operably coupled to the one or more integrated circuits, to transmit the frame asynchronously over an air interface.

19. User apparatus for use within a multi-carrier network, the user apparatus comprising:
an air interface apparatus configured to receive a frame from a node of the network, the frame comprising multiple spread cell identifier parts obtained by the application of a cell-specific spreading code associated with a subset of a spreading code sequence matrix to distinct parts of a cell identifier, the cell identifier indicating an identity of a cell that is serviced by the node, the frame further comprising multiple secondary synchronization channel symbols each corresponding to one of the multiple spread cell identifier parts; and
apparatus configured to, responsive to receiving the frame, despread at least one of the multiple spread cell identifier parts, and determine a received signal quality based at least in part on the despread cell identifier parts.

20. An apparatus comprising:
one or more integrated circuits adapted to apply a cell-specific spreading code to distinct parts of a cell identifier for a cell serviced by a node of a network, to produce multiple spread cell identifier parts, the cell-specific spreading code derived from a subset of a spreading code matrix, the one or more integrated circuits further being configured to insert multiple secondary synchronization channel symbols into the frame, each of the multiple secondary synchronization channel symbols corresponding to one of the multiple spread cell identifier parts; and
wherein the multiple spread cell identifiers are configured to enable a receiver to determine a received signal quality associated with the cell identifier from among a plurality of received cell identifiers.

21. User apparatus configured for communication with a wireless network, the apparatus comprising:
air interface apparatus configured to receive one or more frames each comprising multiple spread cell identifier parts, the multiple spread cell identifier parts having been generated using a cell-specific spreading code applied to a cell identifier for a cell of the network, the cell-specific spreading code having been derived from a subset of a spreading code matrix, the one or more frames further comprising multiple secondary synchronization channel symbols each corresponding to one of the multiple spread cell identifier parts; and apparatus configured to utilize the multiple spread cell identifiers to determine a received signal quality associated with the cell identifier from among a plurality of received cell identifiers.

* * * * *